United States Patent [19]

Ito et al.

[11] Patent Number: 5,015,075
[45] Date of Patent: May 14, 1991

[54] ELECTROCHROMIC ELEMENT

[75] Inventors: Toshiyasu Ito, Kasugai; Takaaki Mori, Inazawa; Mamoru Kato, Nagoya; Masanobu Senda, Aichi, all of Japan

[73] Assignee: Toyoda Gosei Co., Ltd., Nishikasugai, Japan

[21] Appl. No.: 313,478

[22] Filed: Feb. 22, 1989

[30] Foreign Application Priority Data

Apr. 7, 1988 [JP] Japan ................................ 63-86384
Dec. 27, 1988 [JP] Japan ................................ 63-333129

[51] Int. Cl.⁵ ............................................. G02F 1/17
[52] U.S. Cl. ............................................. 350/357
[58] Field of Search ..................... 350/357, 356, 331 R

[56] References Cited

U.S. PATENT DOCUMENTS

| 4,664,934 | 5/1987 | Ito et al. | 427/38 |
|---|---|---|---|
| 4,750,816 | 6/1988 | Ito et al. | 350/357 |
| 4,832,468 | 5/1989 | Ito et al. | 350/357 |
| 4,872,745 | 10/1989 | Fujibawa | 350/357 |
| 4,874,229 | 10/1989 | Ito et al. | 350/357 |
| 4,927,246 | 5/1990 | Ito et al. | 350/357 |

FOREIGN PATENT DOCUMENTS

| 0129423 | 8/1983 | Japan | 350/357 |
|---|---|---|---|
| 0184328 | 10/1984 | Japan | 350/357 |

Primary Examiner—Eugene R. LaRoche
Assistant Examiner—Michael B. Shingleton
Attorney, Agent, or Firm—Cushman, Darby & Cushman

[57] ABSTRACT

An electrochromic element including a color-forming film and an electrolyte sandwiched between a pair of substrates each having a electrode film. Each electrode film is divided into a plurality of electrode pieces with micro grooves. One of the electrode films has its electrode pieces intersected with the electrode pieces of the other film so as to define a plurality of pairs of facing surfaces at intersecting portions. Resistors are connected between each of the electrode pieces and a power source to equalize values of current flowing between each of the pairs of the facing surfaces. The resistor may be an ordinary one, or resistance film made of conductive material, or a projected portion projecting from a longitudinal end of the electrode piece. A predetermined shape of cut-out is formed on the projected portion.

5 Claims, 4 Drawing Sheets

ELECTROCHROMIC ELEMENT

FIELD OF THE INVENTION

The present invention relates to an electrochromic element, particularly to an electrochromic element of large area.

DESCRIPTION OF THE RELATED ART

An example of a planar dimmer which uses an electrochromic element is one which comprises a pair of electrode-equipped substrates facing each other. The electrode-equipped substrates include transparent electrode films of ITO (mixture of idium trioxide and tin dioxide) provided on a transparent substrate made of glass, and between both the transparent electrodes films, a reductive color-forming film of WO3 (tungsten trioxide), oxidative color-forming film of polyaniline and an electrolyte are superimposed. Lead wires are connected to both transparent electrode films to apply a voltage to color or decolor both color-forming films.

When voltage is applied, however, the amount of electricity which flows into both color-forming films differs between the central portion and the peripheral portion because the above-described transparent electrode films are large in electric resistance. As a result there an undesirable difference in the velocity of coloring and decoloring, and therefore, the appearance becomes unattractive. Expecially when coloring and decoloring of a planar electrochromic dimmer with big area, the responsiveness of color-forming films is not uniform.

Moreover, when voltage is applied for coloring or decoloring the color-forming films, there is a difference between the amount of electricity injected to the central portion and the amount to the peripheral portion. More electricity is injected to the peripheral portion. Thus the life of the electrochromic element is disadvantageously shortened.

SUMMARY OF THE INVENTION

An object of the present invention is to provide an electrochromic element which prevents the amount of electricity injected to color-forming films from becoming partially large and thereby ensures a long life, and which colors and decolors the entire film with substantially uniform velocity when voltage is applied.

Another object of the present invention is to provide an electrochromic element which can be made large.

A further object of the present invention is to provide an electrochromic element which improves work efficiency with less manufacturing steps.

In order to accomplish the above-described objects, the electrochromic element of the present invention comprises: a first substrate; a second substrate facing the first substrate; first electrode means provided on a surface of the first substrate which is facing relation the to second substrate, the first electrode means including a plurality of first electrode pieces extending in a first direction, the first electrode pieces being electrically isolated from each other on the first substrate through first grooves; second electrode means provided on a surface of the second substrate which is in facing relation to first substrate, and having substantially the same electric resistance as that of the first electrode means, the second electrode means including a plurality of second electrode pieces extending in a second direction intersecting the first direction, the second electrode pieces being electrically isolated from each other on the second substrate through second grooves, said first and second electrode pieces defining a plurality of pairs of facing surfaces at intersecting portions; color-forming means provided on at least one of the first and second electrode means; an electrolyte provided between both of the electrode means; and resistance means electrically connected to the first and second electrode means so as to substantially equalize values of current flowing between each pair of facing surfaces.

Other objects of the present invention will become apparent upon a review of the following detailed description of the preferred embodiments, and the appended claims. Further, many advantages not mentioned in this specificaiton will be apparent to one skilled in the art upon implementation of the present invention.

DESCRIPTION OF THE PREFERRED EMBODIMENTS

[First Embodiment]

A first embodiment embodying the present invention in a planar electrochromic dimmer will be described below with reference to FIGS. 1 to 3.

Figure 2:
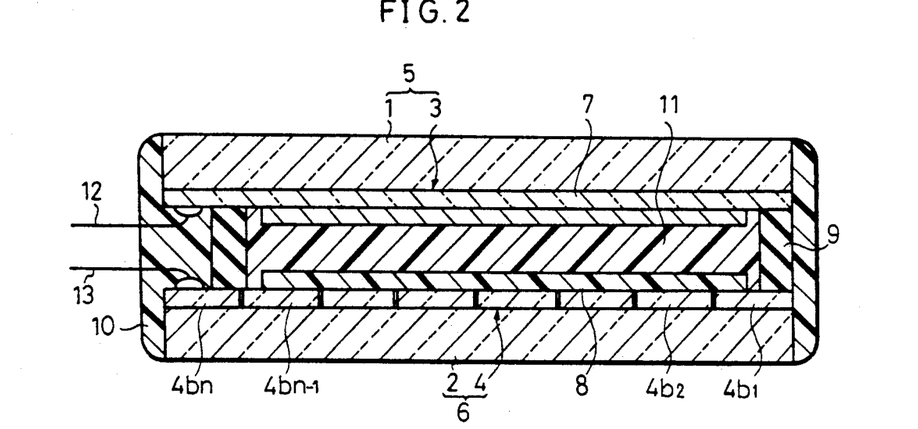
FIG. 2 is a sectional view of a transparent electrode film in accordance with the first embodiment.
Figure 3:
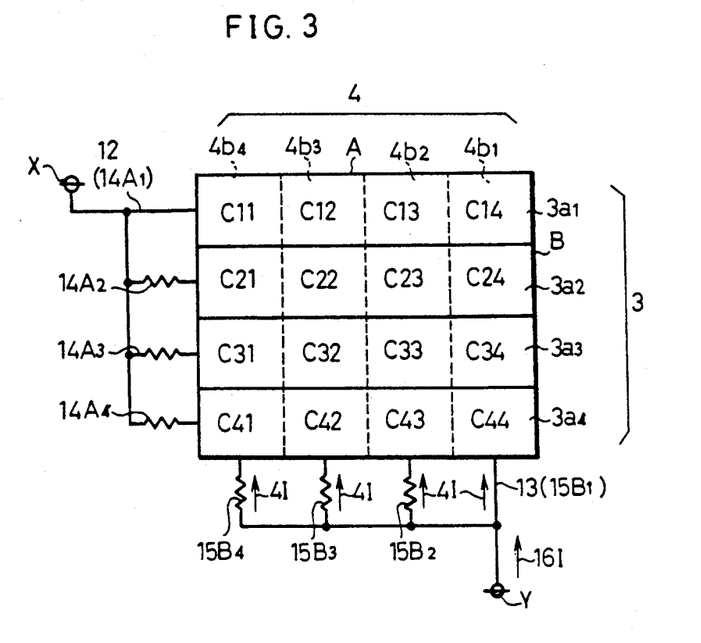
FIG. 3 is a plan view for explaining setting of a resistance value of a resistor.

As shown in FIG. 2, a transparent electrode film 3 as an electrode means comprising ITO (mixture of indium trioxide and tin dioxide) is formed on a transparent upper substrate 1 made of transparent glass so as to constitute an electrode-equipped substrate 5. A lower substrate 2 disposed facing the transparent substrate 1 is made of the same glass as the transparent substrate 1. A transparent electrode film 4 comprising ITO as an electrode means is formed on the surface of the substrate 2 facing the transparent substrate 1. The substrate 2 and the transparent film 4 constitute an electrode-equipped substrate 6.

An oxidative color-forming film 7 comprising polyaniline and a reductive color-forming film 8 comprising WO3 (tungsten trioxide) are formed respectively on the transparent electrode films 3 and 4 of the electrode-equipped substrates 5 and 6. The oxidative color-forming film 7 is formed to a thickness of about 6000 Å by the electropolymerization method. The reductive color-forming film 8 is formed to a thickness of 6000 Å by the electron beam evaporation method.

A spacer 9 with substantially a square ring shape is interposed between both electrode-equipped substrates 5, 6. A sealing member 10 made of epoxy resin is provided at the outside of the spacer 9. The space enclosed by the elctrode-equipped substrates 5 and 6 and the spacer 9 is filled with a solid electrolyte 11.

When voltage is applied between the transparent electrode films 3, 4, oxidative reaction of polyaniline is caused on the color-forming film 7 via the electrolyte 11 while reductive reaction of WO3 is caused on the color-forming film 8 via the electrolyte 11, and both color-forming films 7, 8 turn from colorless to blue.

Both tranparent electrode films 3, 4 are formed, by the ion plating method on the transparent substrates 1, 2 which have been purified via supersonic wave cleaning and possess electric resistance of r $[\Omega/\square]$. Both transparent electrode films 3, 4 in this embodiment, as shown in FIG. 1, are rectangularly shaped as a whole with a longer side A of $\alpha$[cm] and a shorter side B of $\beta$[cm]. The transparent electrode film 3 is etched to form micro grooves in a direction parallel to the longer side A and equally divided into the number m of transparent electrode pieces $3a1$ to $3am$ extending in the horizontal direction with the length of $\alpha$ cm. Also, the transparent electrode film 4 is etched to form micro grooves in a direction parallel to the shorter side B and equally divided into the number n of transparent electrode pieces $4b1$ to $4bn$ extending in the vertical direction with the length of $\beta$ cm.

Power source voltage is applied via lead wires 12, 13 to the upper and lower transparent electrode pieces $3a1$ and $4b1$. Resistors 14A2 to 14Am and 15B2 to 15Bn are connected as resistance means between the other transparent electrode pieces $3a2$ to $3am$ and $4b2$ to $4bn$ and the power source.

Resistors 14A2 to 14Am are connected in parallel to each other. Resistors 15B2 to 15Bn are also connected in parallel to each other. The equation ① represents a reisistance value RAi of the i-th resistor among the resistors 14A2 to 14Am from the lead wire 12, which functions as a resistor 14A1 closest to the power source terminal X, and the equation ② represents the resistance value RBj of the j-th resistor among the resistors 15B2 to 15Bn from the lead wire 13, which functions as a resistor 15B1 closest to the power source terminal Y.

$$RAi = \frac{i \cdot (i-1)}{2m} \cdot \frac{n\beta}{m\alpha} \cdot r \quad \text{①}$$

$$RBj = \frac{j \cdot (j-1)}{2n} \cdot \frac{m\alpha}{n\beta} \cdot r \quad \text{②}$$

wherein $m \geq i \geq 1$, $n \geq j \geq 1$, and Ra1 and Rb1 are respectively 0. In other words, the lead wire 12 can be considered to be the resistor 14A1 and the lead wire 13 can be considered to be the resistor 15B1.

Moreover, values of the current flowing between a pair of surfaces facing each other of the above-described transparent electrode pieces $3a1$ to $3am$ and $4b1$ to $4bn$ are equalized by these resistors 14A1 to 14Am and 15B1 to 15Bn.

Next, the calculating method of the above-mentioned equations ① and ② for setting the resistance values of the above-mentioned resistors 14A1 to 14Am and 15B1 to 15Bn will be explained based on an example of the rectangular transparent electrode films 3, 4, which are divided into quarters extending in the vertical and horizontal directions respectively.

First, voltage is applied between a power source terminal X and a power source terminal Y and the current flows from the power source terminal Y toward the power source teminal X.

If I is the value of the current flowing on each pair of the facing surfaces $3a1$ to $3a4$, $4b1$ to $4b4$, since the facing surfaces C11 to C44 total sixteen in number, the current of the value 16I flows in between each of the pairs of facing surfaces C11 to C44 from the power source terminal Y. The inflow current is shunted into the lead wire 13 and the resistors $15b2$ to $15b4$ as a current of value 4I. This current flows via the electrolyte 11 from each transparent electrode piece $4b1$ to $4b4$ to each transparent electrode piece $3a1$ to $3a4$. And the current of the value 4I flows out of each of the lead wire 12 and resistors 14A2 to 14A4, and the current of the value 16I flows into the power source terminal X.

If RO is the resistance value in the vertical direction of each pair of the facing surfaces C11 to C44, and R1 is the resistance value in the horizontal direction of each pair of the facing surfaces C11 to C44, the voltage applied to each pair of the facing surfaces C11 to C44 in the vertical direction becomes equal in accordance with Ohm's law.

Accordingly, the difference voltages obtained by subtracting the voltage applied between the power source terminals X and Y are equal. If the difference voltage is Vij, the following equation is obtained.

Facing surfaces C11;
$$V11 = 4I \cdot RB4 + 3I \cdot RO + 2I \cdot RO + I \cdot RO \quad (1)$$

Facing surfaces C12;
$$V12 = 4I \cdot RB3 + 3I \cdot RO + 2I \cdot RO + I \cdot RO + 3I \cdot R1 \quad (2)$$

Facing surfaces C13;
$$V13 = 4I \cdot RB2 + 3I \cdot RO + 2I \cdot RO + I \cdot RO + 3I \cdot R1 + 2I \cdot R1 \quad (3)$$

Facing surfaces C14;
$$V14 = 3I \cdot RO + 2I \cdot RO + I \cdot R0 + 3I \cdot R1 + 2I \cdot R1 + I \cdot R1 \quad (4)$$

Facing surfaces C21;
$$V21 = 4I \cdot RB4 + 3I \cdot RO + 2I \cdot R0 + 4I \cdot RA2 \quad (5)$$

Facing surfaces C22;
$$V22 = 4I \cdot RB3 + 3I \cdot RO + 2I \cdot R0 + 4I \cdot RA2 + 3I \cdot R1 \quad (6)$$

Facing surfaces C23;
$$V23 = 4I \cdot RB2 + 3I \cdot RO + 2I \cdot R0 + 4I \cdot RA2 + 3I \cdot R1 + 2I \cdot R1 \quad (7)$$

Facing surfaces C24;
$$V24 = 3I \cdot Ro + 2I \cdot RO + 4I \cdot RA2 + 3I \cdot R1 + 2I \cdot R1 + I \cdot R1 \quad (8)$$

Facing surfaces C31; $V31 = 4I \cdot RB4 + 3I \cdot R0 + 4I \cdot RA3$ \quad (9)

Facing surfaces C32;
$$V32 = 4I \cdot RB3 + 3I \cdot R0 + 3I \cdot R1 + 4I \cdot RA3 \quad (10)$$

Facing surfaces C33;
$$V33 = 4I \cdot RB2 + 3I \cdot R0 + 2I \cdot R1 + 3I \cdot R1 + 4I \cdot RA3 \quad (11)$$

Facing surfaces C34;
$$V34 = 3I \cdot RO + I \cdot R1 + 2I \cdot R1 + 3I \cdot R1 + 4I \cdot RA3 \quad (12)$$

Facing surfaces C41; $V41 = 4I \cdot RB4 + 4I \cdot RA4$ \quad (13)

Facing surfaces C42; $V42 = 4I \cdot RB3 + 3I \cdot R1 + 4I \cdot RA4$ \quad (14)

Facing surfaces C43;
$$V43 = 4I \cdot RB2 + 3I \cdot R1 + 2I \cdot R1 + 4I \cdot RA4 \quad (15)$$

Facing surfaces C44;
$$V44 = 3I \cdot R1 + 2I \cdot R1 + I \cdot R1 + 4I \cdot RA4 \quad (16)$$

Accordingly, comparing equation (1) with equation (4), $$4I \cdot RB4 = 3I \cdot R1 + 2I \cdot R1 + I \cdot R1$$

Thus, $RB4 = (3 + 2 + 1) \cdot R1/4$ \hfill (a)

Moreover, comparing equation (2) with (4), $$4I \cdot RB3 = 2I \cdot R1 + I \cdot R1$$

Thus, $RB3 = (2 + 1) \cdot R1/4$ \hfill (b)

Further, comparing equation (3) with (4), $$4I \cdot RB2 = I \cdot R1$$

Thus, $RB2 = I \cdot R1/4$ \hfill (c)

Figure 1:
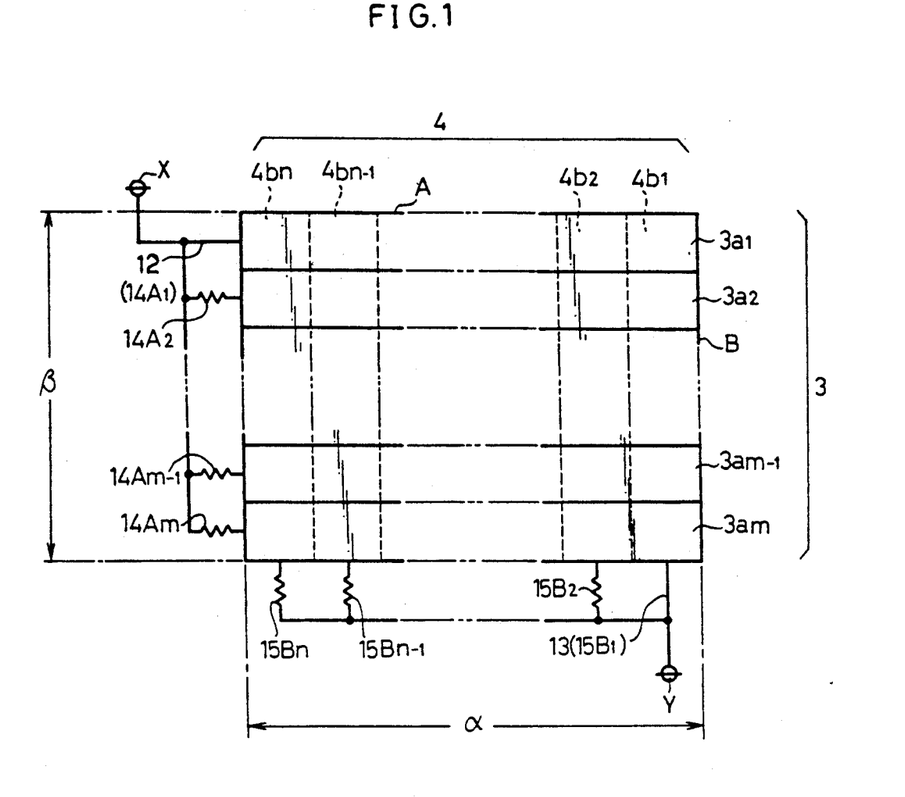
FIG. 1 is a plan view showing a first embodiment of a planar electrochromic dimmer is accordance with the present invention.

Now, a general equation is obtained based upon the above-mentioned equations (a) to (c) with respect to the transparent electrode film 4 divided into n equal pieces extending vertically, as shown in FIG. 1.

$$RBj = \frac{(j-1) + (j-2) + \ldots + 2 + 1}{n} \cdot R_1 = \frac{j \cdot (j-1)}{2n} \cdot R_1 \quad (d)$$

wherein, $n \geq j \geq 1$

Since the electric resistance of the transparent electrode film 3, 4 is r $[\Omega/\square]$.

$$R_1 = \frac{\alpha/n}{\beta/m} \cdot r = \frac{m\alpha}{n\beta} \cdot r \quad (e)$$

$$R_0 = \frac{\beta/m}{\alpha/n} \cdot r = \frac{n\beta}{m\alpha} \cdot r \quad (f)$$

Substituting the equation (e) for the above equation (d), $$RBj = \frac{j \cdot (j-1)}{2n} \cdot \frac{m\alpha}{n\beta} \cdot r \quad ②$$

Also, in each of the resistors 14A1 to 14Am, the resistance values RA2, RA3, RA4 are calculated by comparing the equation (4) with equation (8), equation (4) with equation (12), equation (4) with equation (16). Generalizing these, $$RAi = \frac{(i-1) + (i-2) + \ldots + 2 + 1}{m} \cdot R_0 = \frac{i \cdot (i-1)}{2m} \cdot R_0 \quad (g)$$

Substituting the above equation (f) for the equation (g), $$RAi = \frac{i \cdot (i-1)}{2m} \cdot \frac{n\beta}{m\alpha} \cdot r \quad ①$$

In the planar electrochromic dimmer in the first embodiment, the transparent electrode film 3 of rectangular shape is equally divided into a plurality of transparent electrode pieces $3a1$ to $3am$, which is m in number and extend horizontally while each is electrically isolated through a plurality of etched micro grooves in parallel to the longer side A. In the same way, the transparent electrode film 4 is equally divided into a plurality of transparent electrode pieces $4b1$ to $4bn$, which is n in number and extend vertically while each electrically isolated through a plurality of etched micro grooves in parallel to the shorter side B. The lead wires 12 and 13 are respectively connected with the transparent electrode pieces $3a1$ and $4b1$ to apply power source voltage thereon. The resistors 14A2 to 14Am and 15B2 to 15Bn are connected with the other transparent electrode pieces $3a2$ to $3am$ and $4b2$ to $4bn$ to apply power source voltage while to equalize values of current flowing between each pair of the facing surfaces among the plurality of pairs, which is (m × n) in number and defined at intersecting portions of the transparent electrode pieces $3a1$ to $3am$ and $4b1$ to $4bn$. Therefore, a uniform quantity of electricity is injected per hour into the color-forming films 7 and 8 positioned between each pair of the facing surfaces of the transparent electrode pieces $3a1$ to $3am$ and $4b1$ to $4bn$, when the color-forming films 7 and 8 are colored. In this case, oxidative reaction of polyaniline is caused on the oxidative color-forming film 7, while a reductive reaction of WO3 is caused on the reductive color-forming film 8 via the electrolyte 11, at a position substantially corresponding to each pair of the facing surfaces. As a result, the entire area of the electrochromic dimmer changes color from colorless to blue with a uniform speed, thereby improving its appearance.

When the power source voltage is applied in the direction contrary to the above between the transparent electrode pieces $3a1$ to $3am$ and $4b1$ to $4bn$, the reaction contrary to the above is caused on the oxidative color-forming film 7 and reductive color-forming film 8, at a position substantially corresponding to each pair of the facing surfaces. As a result, the entire dimmer decolors with a uniform speed to return to the transparent state.

Accordingly, the present embodiment is very specially effective when embodied in an electrochromic element or electrochromic dimmer of large area.

Moreover, when the voltage is applied to the transparent electrode films 3 and 4, since the quantity of the electricity injected into the color-forming films 7 and 8 is even and uniform per unit hour and there is no portion where the quantity is partially large, the life of the planar electrochromic dimmer is prolonged.

[Second embodiment]

The second embodiment will now be explained with reference to FIGS. 4 and 5. The present embodiment is different from the first embodiment only in the way of connecting resistors to the transparent electrode pieces $3a2$ to $3am$ and $4b2$ to $4bn$. Other elements are similar to those of the first embodiment and will not be explained.

Figure 4:
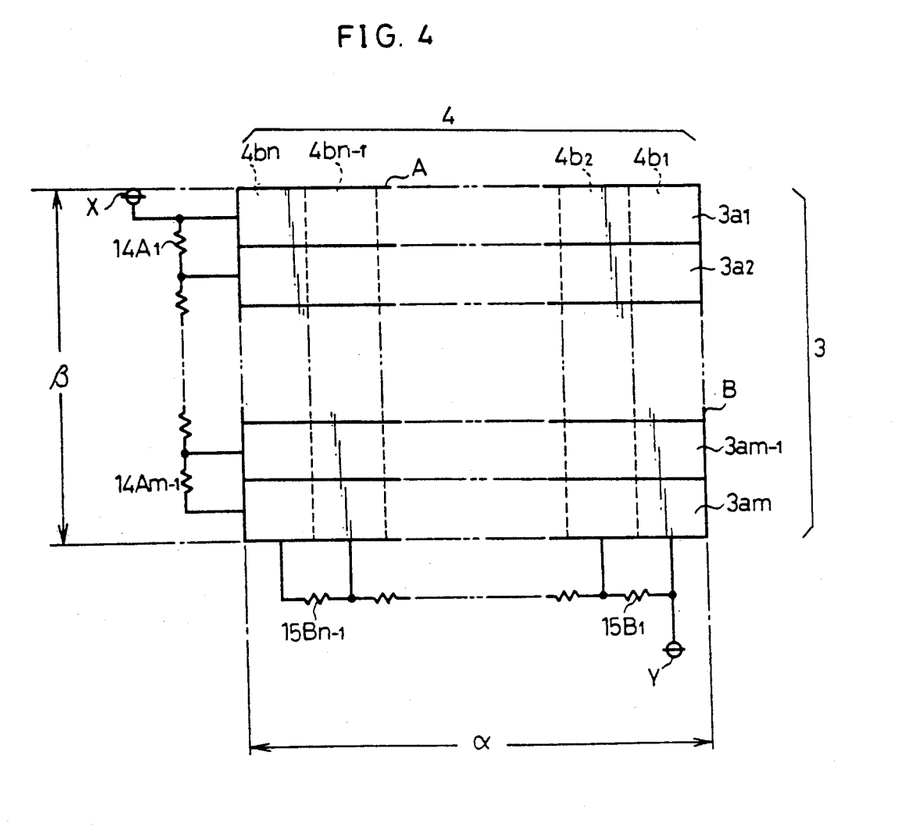
FIG. 4 is a plane view showing a transparent electrode film in accordance with a second embodiment of the invention.

As shown in FIG. 4, the power source voltage is applied to the upper and lower transparent electrode pieces $3a1$ and $4b1$ via the lead wires 12 and 13. The other transparent electrode pieces $3a2$ to $3am$ are connected to the power source terminal X via resistors 14A1 to 14Am−1, while the transparent electrode pieces $4b2$ to $4bn$ to the power source terminal Y via resistors 15B1 to 15Bn−1. The resistors 14A1 to 14Am−1 are connected in series, and the resistors 15B1 to 15Bn−1 are connected in series, too. The following equation ③ represents a resistance value RAI of the i-th resistor among the resistors 14A1 to 14Am−1 from the resistor 14A1 which is closest to the power source terminal X, and the equation ④ represents a resistance value Rbj of the j-th resistor among the resistors 15B1 to 15Bn−1, from the resistor 15B1 which is closest to the power source terminal Y.

$$RAi = \frac{i}{n(m-i)} \cdot \frac{n\beta}{m\alpha} \cdot r \quad (3)$$

$$RBj = \frac{j}{m(n-j)} \cdot \frac{m\alpha}{n\beta} \cdot r \quad (4)$$

wherein $m-1 \geq i \geq 1$, $n-1 \geq j \geq 1$.

These resistors 14A1 to 14Am−1 and 15B1 to 15Bn−1 equalized the values of current flowing between the pairs of facing surfaces of the transparent electrode pieces 3a1 to 3am and 4b1 to 4bn.

Figure 5:
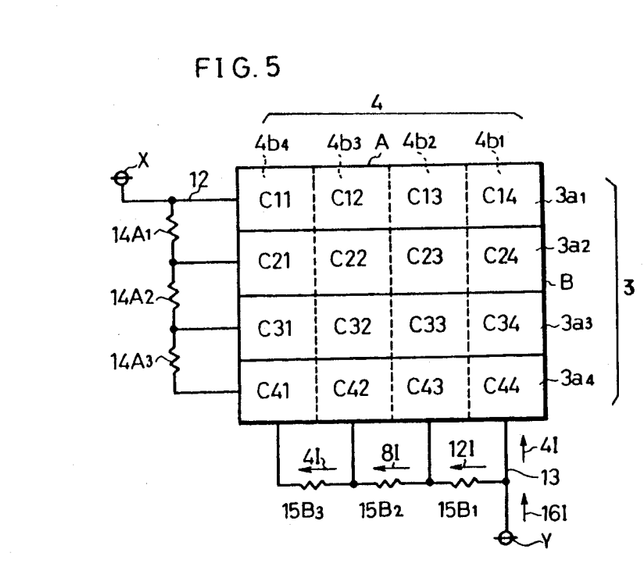
FIG. 5 is a plan view of explaining setting of a resistance value of a resistor.

The calculating methods for the above mentioned equations ③ and ④ are respectively explained in the case of an example of an electrochromic element in which the rectangular transparent electrode films 3 and 4 are divided vertically and horizontally into quarters, as shown in FIG. 5.

In the same manner as in the first embodiment, voltage is applied between the power source terminals X and Y so that current flows from one Y to another X. If I is a value of the current flowing on each pair of the facing surfaces C11 to C44 of the transparent electrode pieces 3a1 to 3am and 4b1 to 4bn, current of 16I flows from the power source terminal Y, and currents of 12I, 8I, 4I are respectively flow into the resistors 15B1 to 15B3. If R0 is a resistance value of each pair of the facing surfaces C11 to C44 in the vertical direction of FIG. 5, and if R1 is a resistance value of each pair of the facing surfaces C11 to C44 in the horizontal direction, voltage applied vertically to each pair of the facing surfaces C11 to C 44 becomes equal according to Ohm's law.

Therefore, the difference voltage obtained by subtracting the voltage applied to each pair of the facing surfaces C11 to C44 from the voltage applied between the power source terminals X and Y becomes equal among the pairs of the facing surfaces C11 to C 44. If the difference voltage is Vij, the following equations are obtained.

Facing surfaces C11;
$V11 = 12I \cdot RB1 + 8I \cdot RB2 + 4I \cdot RB3 + 3I \cdot R0 + 2I \cdot R0 + I \cdot R0$ (17)

Facing surfaces C12;
$V12 = 12I \cdot RB1 + 8I \cdot RB2 + 3I \cdot R0 + 2I \cdot R0 \\ 2I \cdot R0 + I \cdot R0 + 3I \cdot R1$ (18)

Facing surfaces C13;
$V13 = 12I \cdot RB1 + 3I \cdot R0 + 2I \cdot R0 + I \cdot R0 + 3I \cdot R1 + 2I \cdot R1$ (19)

Facing surfaces C14;
$V14 = 3I \cdot R0 + 2I \cdot R0 + I \cdot R0 + 3I \cdot R1 + 2I \cdot R1 + I \cdot R1$ (20)

Facing surfaces C24;
$V24 = 3I \cdot R0 + 2I \cdot R0 + 12I \cdot RA1 + 3I \cdot R1 + 2I \cdot R1 + I \cdot R1$ (21)

Facing surfaces C34;
$V34 = 3I \cdot R0 + 12I \cdot RA1 + 8I \cdot RA3 + 3I \cdot R1 + 2I \cdot R1 + I \cdot R1$ (22)

Facing surfaces C44;
$V44 = 12I \cdot RA1 + 8I \cdot RA2 + 4I \cdot RA3 + RA3 + 3I \cdot R1 + 2I \cdot R1 + I \cdot R1$ (23)

Comparing the equation (19) with equation (20), $12I \cdot RB1 = I \cdot R1$

Thus, $RB1 = [R1 \cdot 1]/[4 \cdot (4-1)]$ (h)

Comparing the equation (18) with equation (19), $8I \cdot RB2 = 2I \cdot R1$

Thus, $RB2 = [R1 \cdot 2]/[4 \cdot (4-2)]$ (i)

Comparing the equation (17) with equation (18), $4I \cdot RB3 = 3I \cdot R1$

Thus, $RB3 = [R1 \cdot 3]/[4 \cdot (4-3)]$ (j)

A generalization is made on the basis of the equations (h) to (j), in the case of the transparent electrode film 4 which is divided equally into n pieces each extending vertically as shown in FIG. 4.

$$RBj = \frac{j}{m(n-j)} \cdot R_1 \quad (k)$$

wherein $n-1 \geq j \geq 1$.

Substituting the equation (e) of the first embodiment for the equation (k), $$RBj = \frac{j}{m(n-j)} \cdot \frac{m\alpha}{n\beta} \cdot r \quad (4)$$

The resistance value RA2, RA3, RA4 is calculated with respect to the resistors 14A1 to 14Am−1, comparing the equations (22) and (23), (21) and (22), (20) and (21). Generalizing these, $$RAi = \frac{i}{n(m-i)} \cdot R_0 \quad (l)$$

wherein $m-1 \geq i \geq 1$.

Substituting the equation (f) of the first embodiment for the equation (1), $$RAi = \frac{i}{n(m-i)} \cdot \frac{n\beta}{m\alpha} \cdot r \quad (3)$$

In the above example, when voltage is applied in coloring and decoloring of the planar electrochromic dimmer, the entire dimmer colors and decolors with even and uniform speed, thereby improving its appearance. Moreover, the quantity of electricity injected into both the color-forming films 7 and 8 can be made equal and even per hour, thereby ensuring a long life of the planar electrochromic dimmer.

[Third embodiment]

Figure 6:
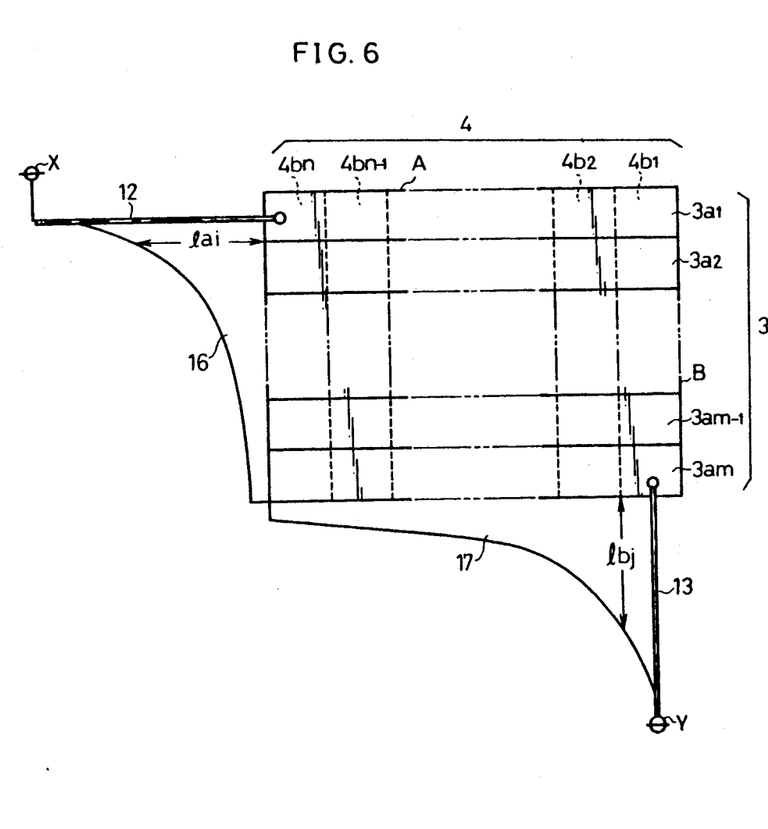
FIG. 6 is a plan view showing a transparent electrode film in accordance with a third embodiment of the invention.

FIG. 6 shows a third embodiment, which is different from the second embodiment in that resistance films 16 and 17 are formed as resistance means, on the sides A and B of the transparent electrode films 3 and 4 to which the lead wires 12 and 13 are connected, in place of the resistors 14A1 to 14Am−1 and 15B1 to 15Bn−1. Each of the resistance films 17 and 18 extends more outwardly as approaching the lead wire 12, 13. Conductive material such as silver paste, carbon paste and ITO may be used for the resistance films 16, 17.

The third embodiment can be considered as an art, which is similar to the second embodiment, and in which the transparent electrode pieces $3a2$ to $3am$ and $4b2$ to $4bn$, except the transparent electrode pieces $3a1$ and $4b1$, are connected to the power source terminals X and Y via the resistance films 16 and 17.

Accordingly, if the r1 [Ω/□] is the electric resistance of the electroconductive material forming the resistance film 16, 17, and lai and lbi are respectively the extension length of the resistance films 16 and 17 at the positions corresponding to the micro grooves between the transparent electrode pieces $3a1$ to $3am$ and $4b1$ to $4bn$, the equations ③ and ④ in the above-mentioned second embodiment are rewritten respectively into the following equations ⑤ and ⑥.

$$RAi = \frac{i}{n(m-i)} \cdot \frac{n\beta}{ma} \cdot r = r_1 \cdot \frac{\beta/m}{lai} \quad ⑤$$

$$RBj = \frac{j}{m(n-j)} \cdot \frac{ma}{n\beta} \cdot r = r_1 \cdot \frac{a/n}{lbj} \quad ⑥$$

The following equation ⑦ represents the extension length lai of the resistance film 16 at the micro groove between the i-th transparent electrode piece and the (i+1)-th transparent electrode piece among the pieces $3a1$ to $3am$ from the transparent electrode piece $3a1$, which is closest to the power source terminal X, and the equation ⑧ represents the extension length lbj of the resistance film 17 at the micro groove between the j-th transparent electrode piece and the (j+1)-th transparent electrode piece among the pieces $4b1$ to $4bn$ from the transparent electrode piece $4b1$, which is closet to the power source terminal Y.

$$lai = \frac{m-i}{i} \cdot \frac{ar_1}{r} \quad ⑦$$

$$lbj = \frac{n-j}{j} \cdot \frac{\beta r_1}{r} \quad ⑧$$

The outline of the leading end of the resistance films 16 and 17 are determined in the direction of extension by calculating the extension length thereof by the above equations ⑦ and ⑧.

In the third embodiment, the same function and effects as in the first and second embodiments are obtained. Moreover, the electroconductive materials such as silver paste, carbon paste, ITO and others are used as the resistance films 16 and 17, so that the planar electrochromic dimmer can be smaller compared with those of the first and second embodiments. Furthermore, the resistance films 16 and 17, if made of ITO, can be formed simultaneously with the formation of the transparent electrode films 3 and 4, thereby decreasing the manufacturing steps and improving work efficiency.

[Fourth embodiment]

Figure 7:
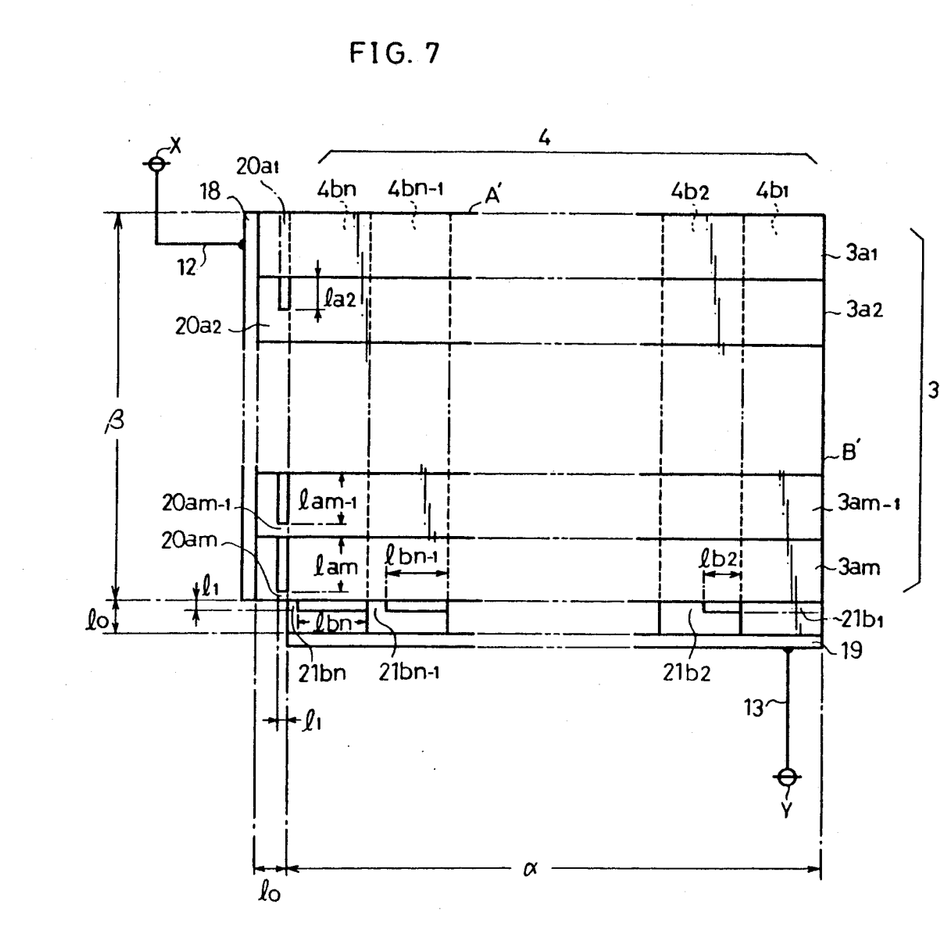
FIG. 7 is a plan view showing a transparent electrode film in accordance with a fourth embodiment of the invention.

FIG. 7 shows a fourth embodiment. The upper transparent electrode film 3 in this embodiment has a rectangular shape with longer sides A' of $(a+lo)$ [cm] and shorter sides B of $\beta$ [cm]. The lower transparent electrode film 4 has a rectangular shape with longer sides A of $a$ [cm] and shorter sides B' of $(\beta+lo)$ [cm]. Conductive pastes 18 and 19 are provided at the edges of the transparent electrode films 3 and 4 and connected with the lead wires 12 and 13.

The upper transparent electrode film 3 is etched to form micro grooves extending along the horizontal direction, and divided equally in the vertical direction into the transparent electrode pieces $3a1$ to $3am$ which are m in number. The lower transparent electrode film 4 is etched to form micro grooves extending along the vertical direction, and divided equally in the horizontal direction into the transparent elctrode pieces $4b1$ to $4bn$ which are n in number.

Subsequetly, when the transparent electrode films 3 and 4 are superposed on each other to have their corners aligned, the left end of each of the transparent electrode pieces $3a1$ to $3am$ projects from the left end of the transparent electrode film 4, while the lower end of each of the transparent electrode pieces $4b1$ to $4bn$ projects from the lower end of the transparent electrode film 3. In the fourth embodiment, these projected portions are used for the resistance means instead of the resistors of the first embodiment.

Namely, each of the transparent electrode pieces $3a2$ to $3am$, except the transparent electrode piece $3a1$, has its left end cut out, by a fixed width 11 and a length lai from the left edge of the transparent electrode film 4, so that resistors $20a1$ to $20am$ with the fixed width 11 are formed at the ends of the transparent electrode pieces $3a1$ to $3am$. Similarly, each of the transparent electrode pieces $4b2$ to $4bn$; except the transparent electrode piece $4b1$, has its left end cut out, by a fixed width 11 and a length lbj from the lower edge of the transparent electrode film 3, so that resistors $21b1$ to $21bn$ with the fixed width 11 are formed at the ends of the transparent electrode pieces $4b1$ to $4bn$.

The resistance values Rai and Rbj of the resistors $20a1$ to $20am$ and $21b1$ to $21bn$ are obtained by the following equations ⑨ and ⑩, respectively.

$$Rai = \frac{l_1}{(\beta/m) - lai} \cdot r \quad ⑨$$

$$Rbj = \frac{l_1}{(a/n) - lbi} \cdot r \quad ⑩$$

wherein $m \geq i \geq 1$, $n \geq j \geq 1$.

Now, the resistors $20a1$ and $21b1$ are not cut out, and, $$Ra_1 = \frac{ml_1}{\beta} \cdot r; \quad Rb_1 = \frac{nl_1}{a} \cdot r$$

The following equation ⑪, obtained from the equation ① of the first embodiment and the equation ⑨, represents the cut out length lai, which determines the resistance value Rai of the i-th resistor among the resistors $20a1$ to $20am$ from the transparent electrode piece $3a1$, which is closest to the power source terminal X.

$$\begin{aligned} Rai &= \frac{i \cdot (i-1)}{2m} \cdot \frac{n\beta}{ma} \cdot r + Ra_1 \\ &= \frac{i \cdot (i-1)}{2m} \cdot \frac{n\beta}{ma} \cdot r + \frac{ml_1}{\beta} \cdot r \\ &= r \cdot \frac{l_1}{(\beta/m) - lai} \end{aligned}$$

Subsequently, $$(\beta/m) - lai = \frac{l_1}{\frac{i \cdot (i-1) \cdot n\beta}{2m^2 a} + \frac{ml_1}{\beta}} \quad ⑪$$

-continued
$$lai = (\beta/m) - \cfrac{l_1}{\cfrac{j \cdot (i-1) \cdot n\beta}{2m^2\alpha} + \cfrac{ml_1}{\beta}}$$

The following equation ⑫, obtained from the equation ② of the first embodiment and the equation ⑩, represents the cut out length lbj, which determines the resistance value Rbj of the j-th resistor among the resistors $21b1$ to $21bn$ from the transparent electrode piece $4b1$, which is closest to the power source terminal Y.

$$\begin{aligned} Rbj &= \frac{j \cdot (j-1)}{2n} \cdot \frac{ma}{n\beta} \cdot r + Rb_1 \\ &= \frac{j \cdot (j-1)}{2n} \cdot \frac{ma}{n\beta} \cdot r + \frac{nl_1}{\alpha} \cdot r \\ &= r \cdot \frac{l_1}{(a/n) - lbj} \end{aligned}$$

Subsequently, $$lbj = (a/n) - \cfrac{l_1}{\cfrac{j \cdot (i-1) \cdot ma}{2n^2\beta} + \cfrac{nl_1}{\alpha}} \qquad ⑫$$

The present invention may be realized as described in the following.

(i) In the above-described first to fourth embodiments, the transparent electrode films 3 and 4 are rectangularly shaped, and the transparent electrode film 3 is equally divided in the vertical direction into the pieces $3a1$ to $3am$ of number m which extend in parallel to the side A, while the transparent electrode film 4 is equally divided in the horizontal direction into the pieces $4b1$ to $4bn$ of number n which extend in parallel to the side B. However, the transparent electrode films may be formed in the square shape and each divided into a rectangularly shaped pieces, so that the upper film has pieces which intersect with pieces of the lower film.

Figure 8:
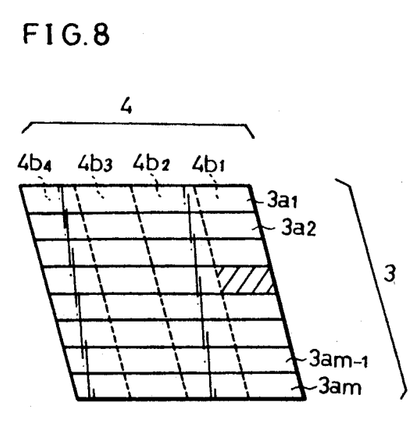
FIGS. 8-10 are each plan views respectively showing transparent electrode films in accordance with further modification of the invention.

(ii) As shown in FIG. 8, each of the transparent electrode films 3 and 4 may be shaped as a parallelogram, which is divided into upper or lower parallelogrammic pieces that constitute the transparent electrode film 3, 4, so that the upper and lower transparent electrode pieces intersect each other. In this modification, resistance values in the horizontal and vertical directions, are respectively obtained at a pair of facing surfaces shown by oblique lines in FIG. 8. Then, appropriate resistors may be set on the basis of the equations ① and ② of the first embodiment and ③ and ④ of the second embodiment.

Figure 9:
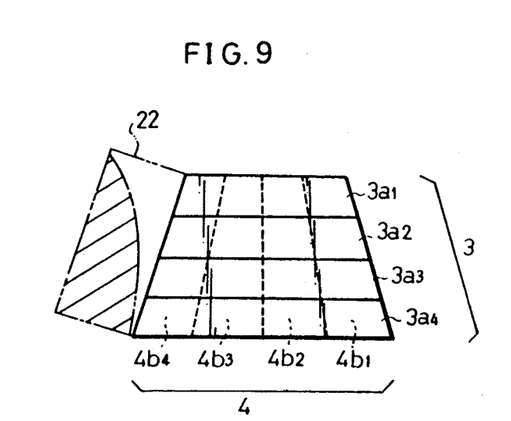

(iii) As shown in FIG. 9, each of the transparent electrode films 3 and 4 may be shaped into a trapezoid, which is divided into other trapezoidal pieces, so that the pieces constituting both the transparent electrode films 3 and 4 intersect each other.

Resistance films like those of the third embodiment are suitable for the resitance means of this modification. For example, a conductive paste 22 is first coated on the transparent electrode film 3 of rectangular shape as shown by two dot chain line, then a portion shown by oblique lines is cut out of the conductive paste 22, while monitoring the coloring speed of the entire element through an application of voltage between both the transparent electrode films 3 and 4.

Figure 10:
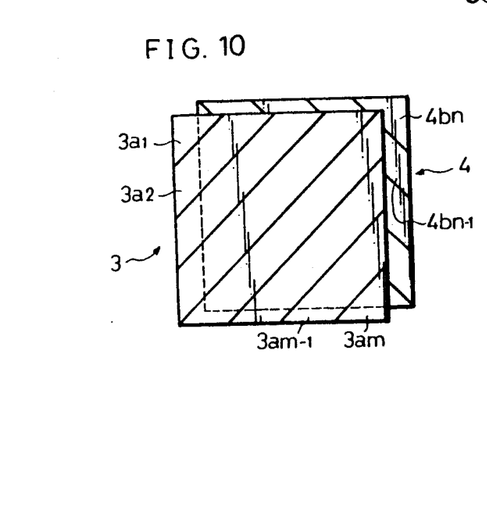

(iv) As shown in FIG. 10, each of the transparent electrode films 3 and 4 may be square shaped, which is divided into pieces in parallel to a diagonal line of the transparent electrode films 3, 4. In this modification, resistance films like those of the third embodiment are suitable for the resistance means, too.

(v) In the previous embodiments, the transparent electrode films 3 and 4 are respectively formed on a pair of the transparent substrates 1 and 2. However, one of the substrates may be made of opaque material, and an opaque electrode film formed thereon with substantially the same electric resistance as that of the transparent electrode film 3, thereby constituting an electrode-equipped substrate. A colored synthetic resin plate or metal plate or the like may be used as the opaque substrate.

(vi) In the previous embodiments, solid electrolyte is used, however, semi solid or liquid electrolyte may be used, as well.

As many apparently widely differnt embodiments of this invention may be made without departing from the spirit and scope thereof, it is to be understood that the invention is not limited to the specific embodiments thereof except as defined in the appended claims.

What is claimed is:

1. An electrochromic element comprising:
   a first substrate;
   a second substrate facing said first substrate;
   first electrode means provided on a surface of said first substrate which is in facing relation to said second substrate, said first electrode means including a plurality of first electrode pieces extending in a first direction, said first electrode pieces being electrically isolated from each other on said first substrate with first grooves;
   second electrode means provided on a surface of said second substrate which is in facing relation to said first substrate, and having substantially the same electric resistance as said first electrode means, said second electrode means including a plurality of second electrode pieces extending in a second direction intersecting said first direction, said second electrode pieces being electrically isolated from each other on said second substrate with second grooves, said first and second electrode pieces defining a plurality of pairs of facing surfaces at intersecting portions;
   color-forming means providing on at least one of said first and second electrode means;
   an electrolyte provided between said electrode means; and
   resistance means electrically connected to said first and second electrode means so as to substantially equalize values of current flowing between each said pair of facing surfaces.

2. An electrochromic element as defined in claim 1, wherein said resistance means comprises,
   first resistors each electrically connected between a first power source terminal and each of said first electrode pieces, said first resistors being connected in parallel to each other, and
   second resistors each electrically connected between a second power source terminal and each of said second electrode pieces, said second resistors being connected in parallel to each other.

3. An electrochromic element as defined in claim 1, wherein said resistance means comprises,
   first resistors each electrically connected between a first power source terminal and each of said first electrode pieces, said first resistors being connected in series, and second resistors each electrically connected between a second power source terminal and each of said second electrode pieces, said second resistors being connected in series.

4. An electrochromic element as defined in claim 1, wherein said resistance means comprises, a first resistance film electrically connected between a first power source terminal and said first electrode pieces, said first resistance film having an extension length lai extending in a longitudinal direction of said first electrode piece at a position corresponding to said first groove between said first electrode pieces, said extension length lai gradually decreasing as separating from one of said first electrode pieces, which is closest to said first power source terminal, in a longitudinal direction of said second electrode piece, a second resistance film electrically connected between a second power source terminal and said second electrode pieces, said second resistance film having an extension length lbj extending in the longitudinal direction of said second electrode piece at a position corresponding to said second groove between said second electrode pieces, said extension length lbj gradually decreasing as separating from one of said second electrode pieces, which is closest to said second power source terminal, in the longitudinal direction of said first electrode piece.

5. An electrochromic element as defined in claim 1, wherein, each of said first electrode pieces has, at its longitudinal end, a first projected portion extending in a longitudinal direction thereof and projecting beyond said second electrode pieces, said first projected portion being electrically connected to a first power source terminal, each of said second electrode pieces has, at its longitudinal end, a second projected portion extending in a longitudinal direction thereof and projecting beyond said first electrode pieces, said second projected portion being electrically connected to a second power source terminal, and said resistance means comprises first resistors each obtained by cutting out said first projected portion by a length l1, in the longitudinal direction of said first electrode piece, and a length lai, in the longitudinal direction of said second electrode piece, and second resistors each obtained by cutting out said second projected portion by a length l1, in the longitudinal direction of said second electrode piece, and a length lbj, in the longitudinal direction of said first electrode piece.

* * * * *